US006806425B1

(12) United States Patent　　(10) Patent No.: US 6,806,425 B1
O'Neill　　(45) Date of Patent: Oct. 19, 2004

(54) APPLIANCE MOUNTING APPARATUS

(75) Inventor: Edward L. O'Neill, Oakland, CA (US)

(73) Assignee: Lucasey Manufacturing Co., Oakland, CA (US)

( * ) Notice: Subject to any disclaimer, the term of this patent is extended or adjusted under 35 U.S.C. 154(b) by 0 days.

(21) Appl. No.: 10/607,850

(22) Filed: Jun. 27, 2003

(51) Int. Cl.$^7$ ................................................. H02G 3/14
(52) U.S. Cl. ............................ 174/66; 174/67; 220/241
(58) Field of Search ........................... 174/50, 66, 67, 174/58, 54; 220/3.8, 3.3, 3.9, 241, 242; 248/289.11

(56) References Cited

U.S. PATENT DOCUMENTS

| | | | |
|---|---|---|---|
| 4,878,645 A | | 11/1989 | O'Neill |
| 4,973,023 A | | 11/1990 | O'Neill |
| D320,928 S | | 10/1991 | Boscacci et al. |
| 5,169,114 A | | 12/1992 | O'Neill |
| 5,228,584 A | * | 7/1993 | Williams, Jr. ................. 220/3.8 |
| 6,102,348 A | | 8/2000 | O'Neill |
| 6,347,439 B1 | * | 2/2002 | Bach Lahor ...................... 27/1 |
| 6,642,453 B2 | * | 11/2003 | Shotey et al. .................. 174/66 |

* cited by examiner

Primary Examiner—Dhiru R. Patel
(74) Attorney, Agent, or Firm—Niro, Scavone, Haller & Niro

(57) ABSTRACT

The present invention concerns an apparatus for mounting an appliance to a support surface. The invention includes a first base and a second base. The first base includes a chamber and at least one keyway aperture. The second base is sized to substantially cover the chamber and the at least one keyway. Also include on the second base is at least one locking member. The locking member is positioned on the second base to releasably engage the keyway to interlock the bases together.

4 Claims, 4 Drawing Sheets

Fig. 2
Fig. 3
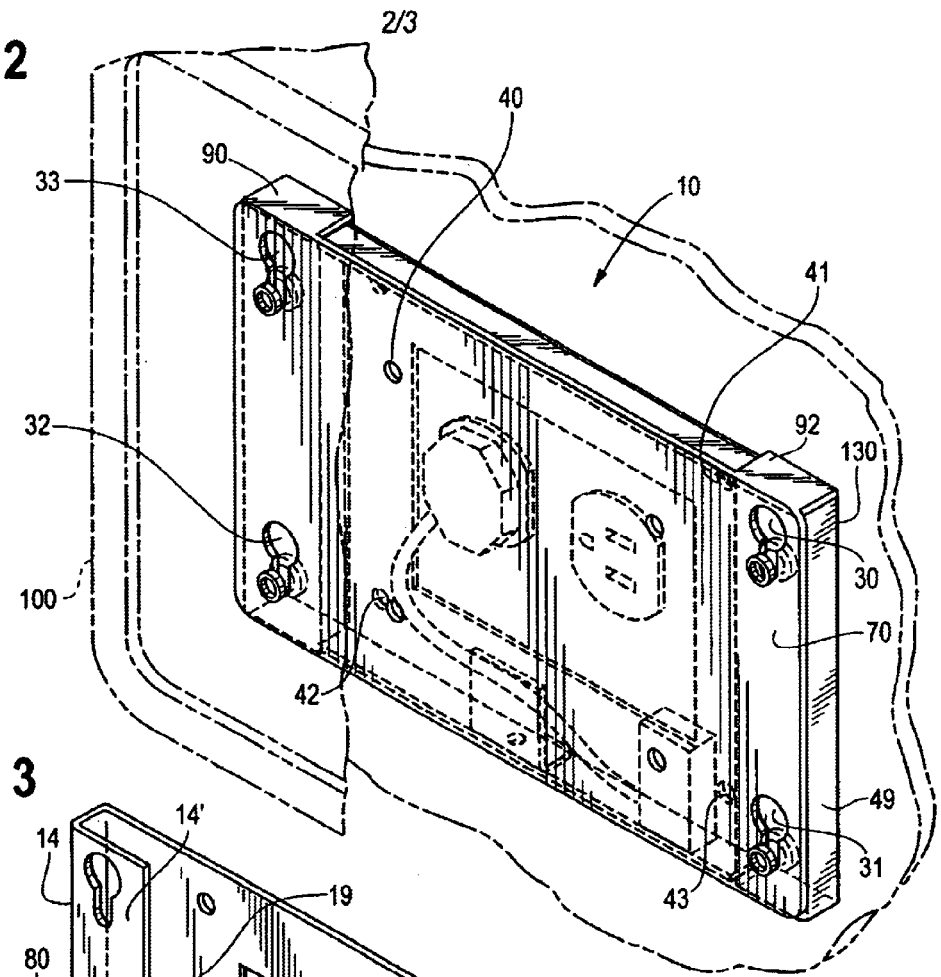
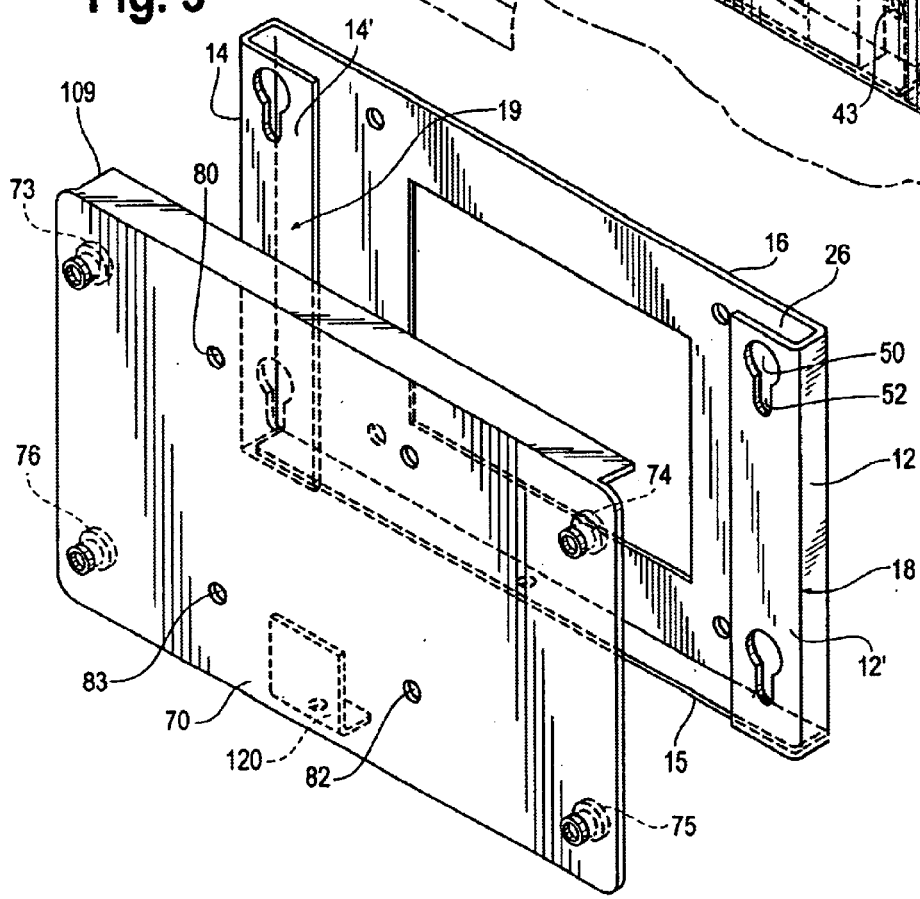

APPLIANCE MOUNTING APPARATUS

BACKGROUND OF THE INVENTION

The present invention relates to an apparatus for mounting appliances to a support surface. More specifically, the present invention relates to an appliance mounting apparatus that provides interlocking components that are easily assembled and which can accommodate a wide variety of appliances, especially flat screen monitors.

SUMMARY OF THE INVENTION

The present invention provides an apparatus having a first base adapted to be secured to a support surface. The base includes an aperture sized to accommodate an electrical outlet. In addition, the base defines a storage cavity or chamber in which electrical components associated with the appliance may be securely housed. A second base, to which the appliance is secured, is adapted to interlock with the first base to securely mount the appliance to the support surface. The second base encloses the storage cavity for resistance to tampering and for safety concerns.

DESCRIPTION OF THE DRAWINGS

These and other features, objects and advantages of the present invention will become apparent from the following description and drawings wherein like reference numerals represent like elements in several views, and in which:

FIG. 2 is a perspective illustrating how the bases of the present invention interlock.

FIG. 3 is a perspective view of an alternate embodiment of a base which may be used with the present invention.

DESCRIPTION OF THE PREFERRED EMBODIMENTS

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

Figure 1:
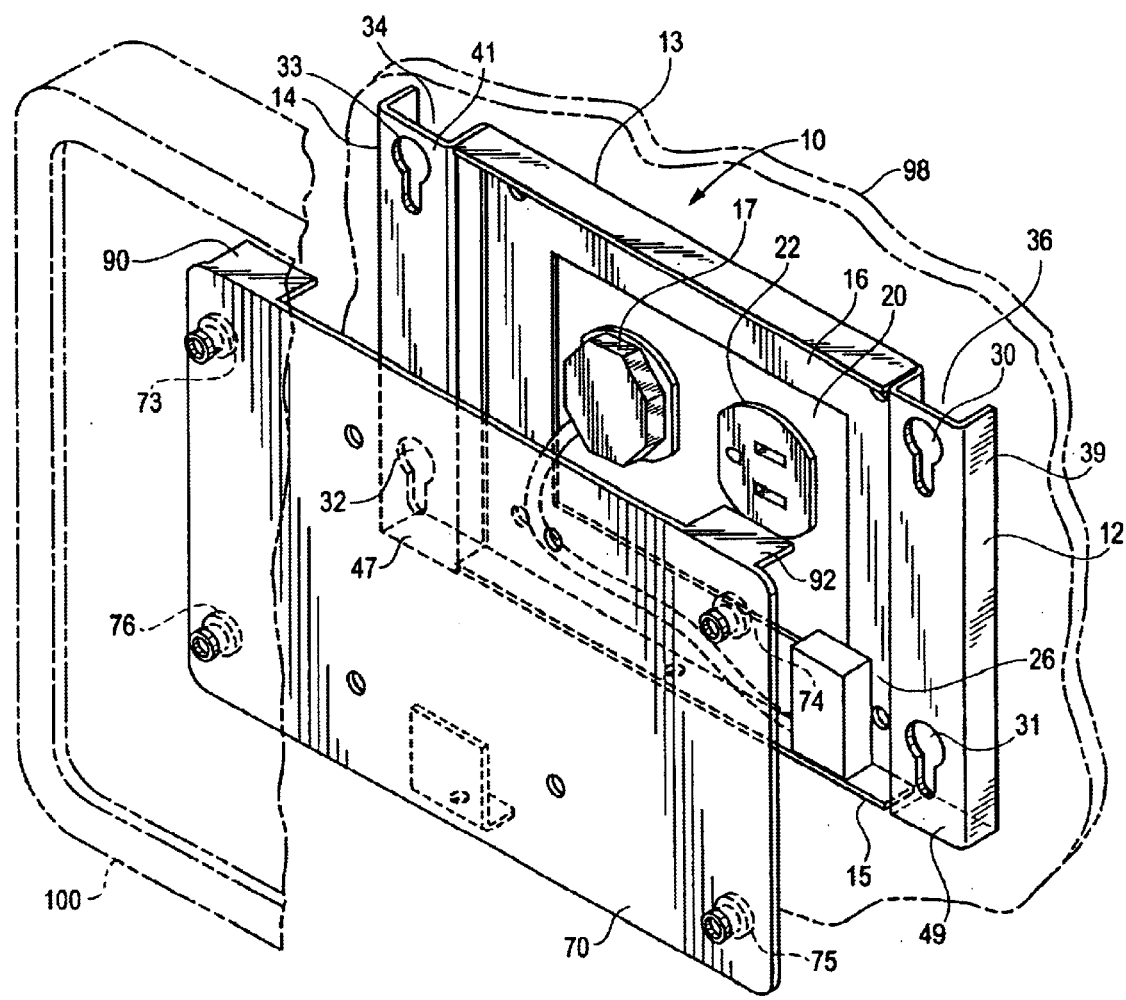
FIG. 1 is a perspective view of one embodiment with portions removed to reveal various aspects of the present invention.

As shown in FIG. 1, one embodiment of the present invention includes a first base 10 having a base wall 16 and opposing side walls 12–15 which are connected to base wall 16. An aperture 20 is located in base 10. Aperture 20 may be sized to encompass an electrical outlet such as duplex 22. Side walls 12–15 and wall 16 are arranged to form a storage chamber 26 wherein at least one of the walls 12–15 may further function as a support surface for electrical components.

Figure 4:
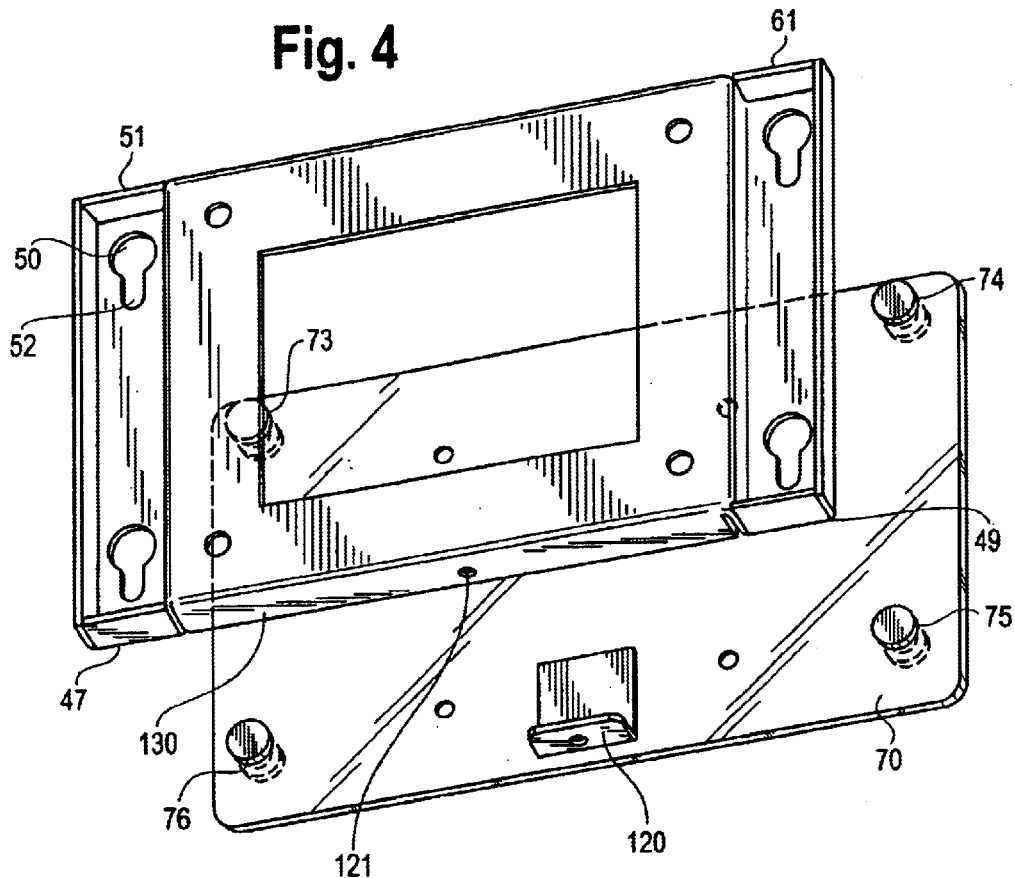
FIG. 4 is a rear view of an embodiment of the present invention.
Figure 6:
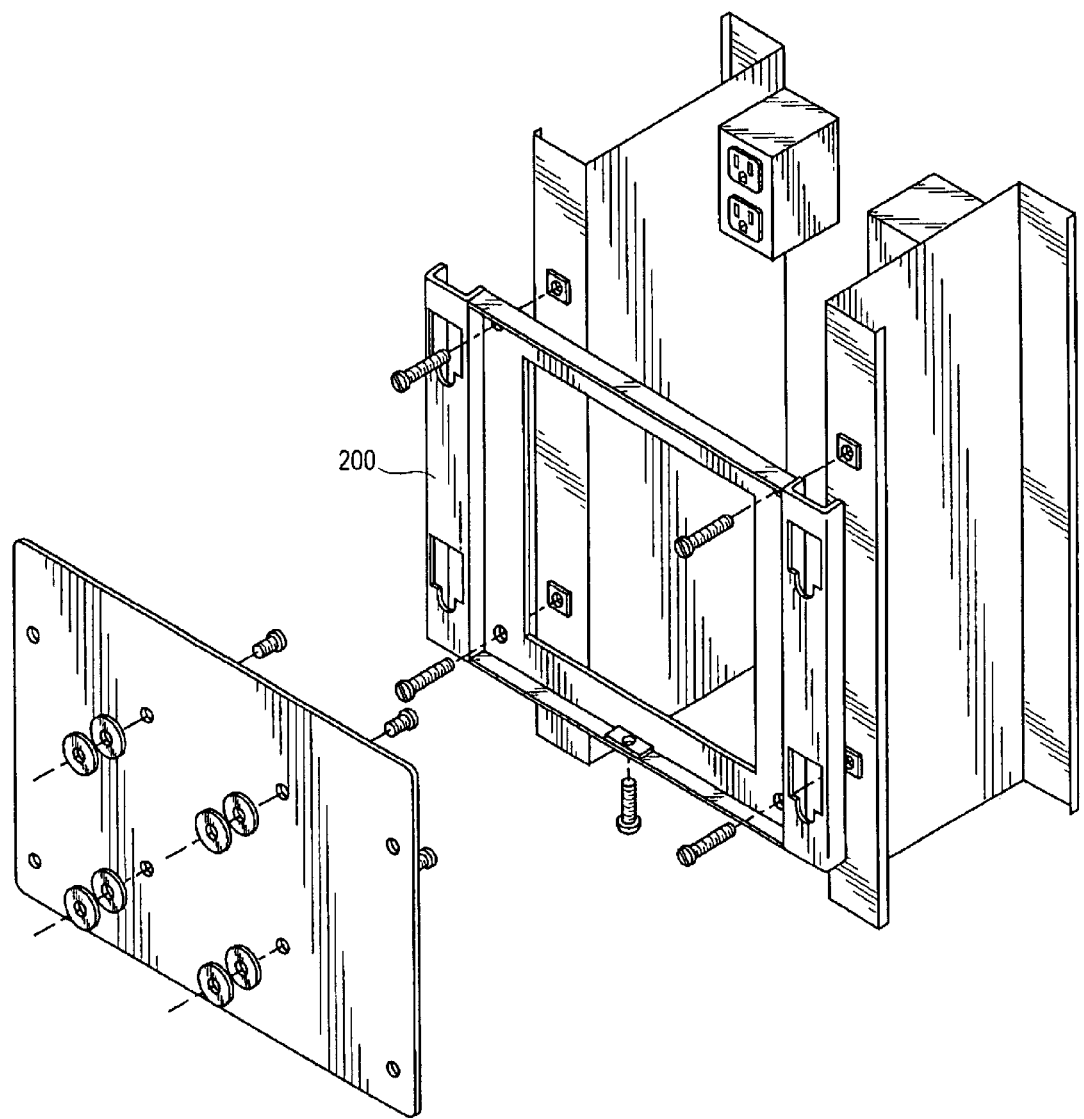
FIG. 6 is a perspective view of an alternate embodiment illustrating how one embodiment of the present invention may be mounted to wall studs.

Base 10 also includes a plurality of opposingly located keyways 30–33. The keyways may be located on concave sections 39 and 41 so as to form channels 34 and 36. The channels provide clearance for locking pins or members which will be discussed below. Access to the channels may be restricted or blocked by sections 47, 49, 51 and 61 as shown in FIGS. 1 and 4. This enhances tamper-resistance and the security of the device. While the keyways are shown as being located outside and along opposing edges of storage chamber 26, as shown in FIG. 1, the keyways may be positioned inside storage chamber 26 as well as shown in FIG. 3. In this embodiment, the keyways are located on front walls 12' and 14' inwardly offset with respect to walls 12 and 14 Walls 12 and 12' and 14 and 14', respectively, form opposing inward facing channels 18 and 19. In this way, chamber 26 provides the clearance for the locking members. Mounting holes 4–43 are also provided on base 10 which permit base 10 to be mounted to a support surface by threaded fasteners and the like. As shown in FIG. 6, mounting holes 40–43 and may be arranged to permit base 10 to be mounted to wall studs 200 and 201 which are typically 18 spaced inches apart.

As shown in FIG. 4, the design of the keyway is such that it includes an opening 50 which is larger in size than slot portion 52, which may form a slot. As explained below, this permits the locking members or pins to be retained within the keyway.

As shown in FIGS. 1–5, the present invention also includes a second base 70 which may be substantially planar in configuration so as to retain a slim profile. Of course, other shapes may be used as well to form base 70. In addition, locking members or pins 73–76 are disposed on base 70 in locations which permit the pins to align with keyways 30–33.

Figure 5:
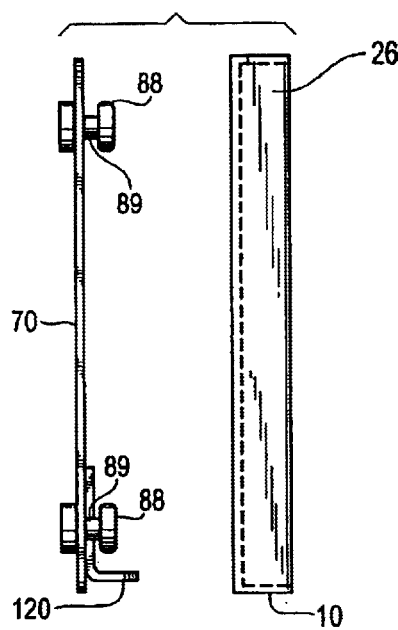
FIG. 5 is a side view of the present invention.

As shown in FIG. 5, each locking pin may include a head portion 88 which is smaller in size than the opening 50 of a keyway yet larger in size than opening 52. A shank 89 connects head portion 88 to base 70. Shank portion 89 is sized to be smaller in size than opening 52 so as to permit the shank portion to move within the slot. Mounting holes 80–83 may also be included on base 70 to assist in mounting an appliance to the base.

As shown in FIG. 1, extensions 90 and 92 may also be provided on base 70. The extensions are positioned and sized to block or restrict access to the end of each channel which does not include either section 47 or 49. Alternately, as shown in FIG. 3, lip 109 may be used as well.

In use, base 10 is first mounted to a support surface in any number of ways known to those of skill in the art. If an electrical existing outlet is to be used with the appliance, the outlet would be positioned within cavity 16. Any electrical components that may be used with the appliance may be stored in chamber 26 and, if desired, placed upon or mounted to one of the sidewalls.

The appliance 100 is then mounted to base 70 in any number of ways known to those of skill in the art. Once mounted to, base 70, base 70 is positioned so that the locking members are inserted through the keyways and the base is then lowered until the shank of the locking member bottoms out in the slotted portion of the keyway. The head portion of the locking member, since it is larger in size than the slot, holds base 70 securely in place. A lock 120 may then be used to secure the system by threading fastener 122 through opening 124 in base 10 until the fastener fully engages internally threaded bore 26 in base 70. In addition, base 70 is sized so as to cover chamber 26 and the keyways. In addition, a substantially continuous rim 130 is formed around the device by the sidewalls, and extensions 90 and 92 and sections 47 and 49. The rim 130 substantially enclosed chamber 26 and the channels. Alternatively, lip 109 and side walls 12, 14 and 15 may be used to form a substantially continuous rim 130 as well as shown in FIG. 3. This, as stated above, improves the tamper resistance of the device.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. An apparatus for mounting an appliance to a support surface comprising: a first base having a base wall and a plurality of side walls forming a chamber; said base wall engaging said supporting surface and having an aperture sized to accommodate an electrical outlet mounted to the support surface; two opposingly located concave sections positioned adjacent said first base, at least one keyway located on each of said concave sections; a second base sized to substantially cover said chamber and said keyways; a plurality of locking members positioned on said second base to releasably engage said keyways; said concave sections defining channels which are sized to receive a head portion of said locking member.

2. The appliance mounting apparatus of claim 1 wherein said second base includes two extensions that form stops to block one end of each of the channels.

3. The appliance mounting apparatus of claim 2 wherein one of said side walls and said extensions form a substantially continuous top wall.

4. An appliance mounting apparatus comprising: a first base having a base wall; an aperture in said base wall sized to accommodate an electrical outlet mounted to the support surface; opposingly located inwardly facing channels on said first base which together with said base wall define a chamber, at least one keyway located on each of said channels; a second base sized to substantially cover said chamber and said keyways; and a plurality of locking members positioned on said second base to releasably engage said keyways.

\* \* \* \* \*